Figures 1, 2, 3:
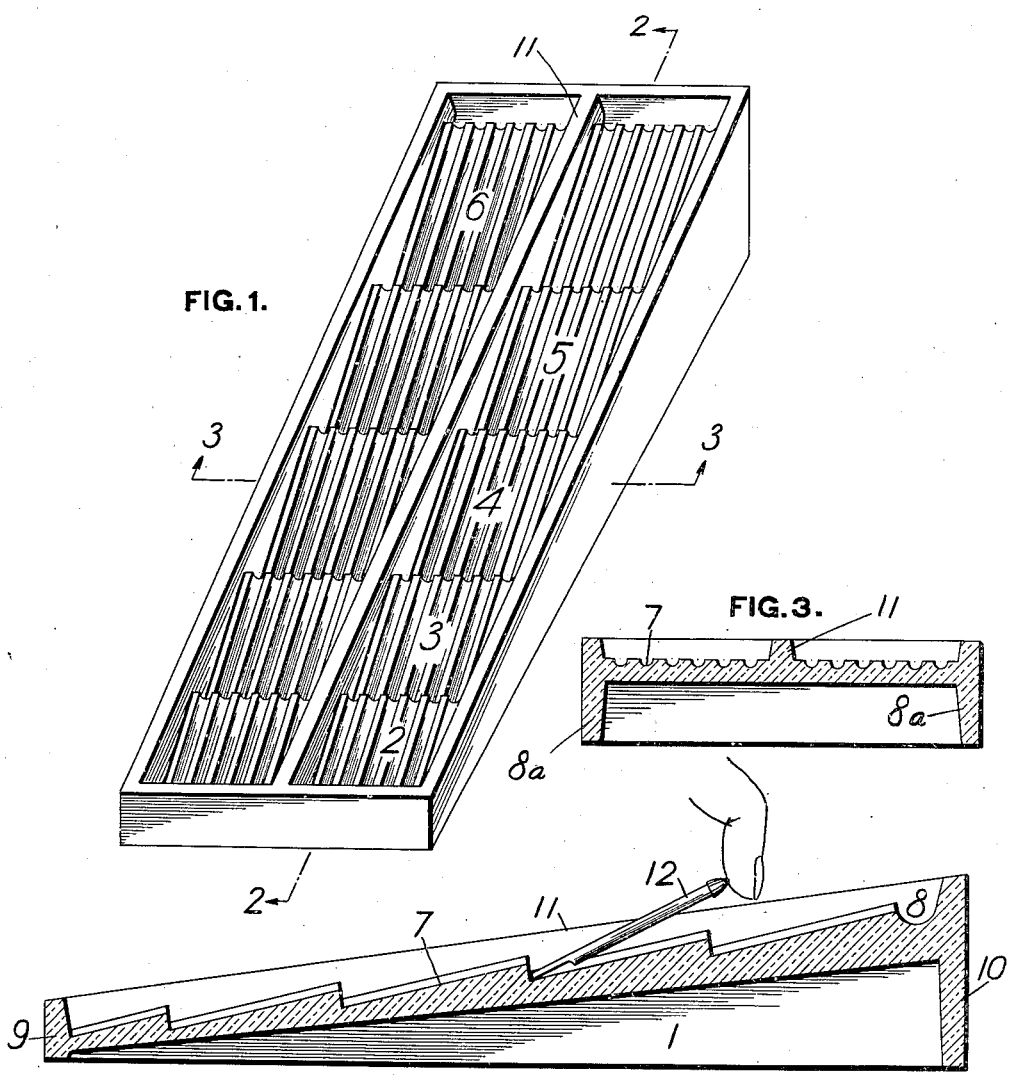

W. L. SMITH.
RACK FOR DENTAL AND LIKE TOOLS.
APPLICATION FILED AUG. 28, 1908.

935,419.

Patented Sept. 28, 1909.

WITNESSES
Chas. Losterman.
Marie Draper.

INVENTOR
Wesley Linford Smith.
By Frank W. Winter
His Attorney

UNITED STATES PATENT OFFICE.

WESLEY LINFORD SMITH, OF PITTSBURG, PENNSYLVANIA.

RACK FOR DENTAL AND LIKE TOOLS.

935,419.
Specification of Letters Patent. Patented Sept. 28, 1909.

Application filed August 28, 1908. Serial No. 450,763.

*To all whom it may concern:*

Be it known that I, WESLEY LINFORD SMITH, a resident of Pittsburg, in the county of Allegheny and State of Pennsylvania, have invented a new and useful Improvement in Racks for Dental and Like Tools, of which the following is a specification.

This invention relates to racks for holding small tools such as used by dentists, surgeons and the like, and more particularly to a rack for holding dental burs.

The object of the invention is to provide a rack for this purpose, which is simple and cheap of construction; which is entirely germ-proof, or capable of being subjected to antiseptic treatment, and also which is convenient to use.

Generally stated, the invention consists of a rack formed of some suitable germ-proof material, preferably vitreous material, such as glass or porcelain, and having a series of inclined surfaces arranged in stepped relation to each other and provided with tool receiving grooves.

In the accompanying drawing, Figure 1 is a perspective view of the tool rack; Fig. 2 is a longitudinal section through the same on line 2—2 Fig. 1; and Fig. 3 is a transverse section on the line 3—3, Fig. 1.

The tool rack comprises a suitable body 1, having its bottom surface either flat or provided with side ribs or otherwise suitably formed to be supported on a table or in a drawer, or the like. On its upper surface this body is provided with a series of inclined tool support surfaces or trays, five such surfaces being shown and marked 2, 3, 4, 5 and 6 respectively. These surfaces are placed successively at higher elevations, or in stepped relation with each other, as clearly shown. Each inclined surface is provided with a series of tool receiving grooves 7, extending from the lower to the upper end thereof. At the upper end of the upper surface is a transverse depressed portion 8. The tool supporting surfaces are surrounded by a rim or barrier, such as the side walls, bottom wall 9, and top wall 10, and preferably also a wall or partition 11, extends along the middle of inclined surfaces, dividing each surface into two parts.

The tools are indicated at 12, and the several inclined surfaces will be made of such length that the ends of the tool shanks rest against the vertical walls at the lower end of each inclined surface, and their heads or burs project over the vertical wall at the upper end of the inclined surface. Consequently a tool can be picked up merely by pressing a finger against the upper or bur end of the tool and then lifting on the same, the lower end of the tool resting against the vertical wall at the lower end of the inclined surface and the tool pivoting on said lower end.

The rack is so formed that it will hold a large number of small tools and each one plainly exposed, and furthermore, it is so constructed that a single tool can be readily picked out without disturbing the others. The rack is, therefore, very convenient to use.

The tool rack will be formed of some suitable germ-proof material, or at least, material which can be subjected to any kind of antiseptic treatment, such as boiling and the like,—to render the same and the tools held therein sanitary. Preferably the rack will be formed of vitreous material, such as glass or porcelain having a highly glazed or vitreous surface, so that the rack is non-porous and does not serve as a lodgment or culture for germs. If desired, it may be made of metal coated with a vitreous or non-porous enamel.

What I claim is:

1. A rack for dental and similar tools and instruments, comprising a body of vitreous material provided with a series of inclined surfaces placed in stepped relation to each other, and having tool receiving grooves formed therein and running from the lower to the upper edges of said surfaces.

2. A rack for dental and similar tools and instruments, comprising a body of germ-proof material higher at one end than at the other and provided with a series of inclined surfaces arranged in stepped relation to each other and each higher than the preceding one and provided with tool receiving grooves running from their lower to their upper edges.

3. A rack for dental and similar tools and instruments, comprising a body of vitreous material provided with an inclined surface having formed therein tool receiving grooves running from the lower to the upper edges of said surface, said body having a vertical wall at the lower edge of said inclined surface and a depression at the upper edge of said inclined surface, whereby tools will rest with their ends against the bottom vertical wall and having their upper ends projecting over said recess.

In testimony whereof, I have hereunto set my hand.

WESLEY LINFORD SMITH.

Witnesses:
WILLIAM I. KING,
F. W. WINTER.